(12) United States Patent
Harelstad et al.

(10) Patent No.: US 6,533,961 B2
(45) Date of Patent: Mar. 18, 2003

(54) DURABLE FLUORESCENT ORGANIC PIGMENTS AND METHODS OF MAKING

(75) Inventors: R. Ellen Harelstad, Woodbury, MN (US); David M. Burns, Woodbury, MN (US); Lee A. Pavelka, Cottage Grove, MN (US)

(73) Assignee: 3M Innovative Properties Company, St. Paul, MN (US)

(*) Notice: Subject to any disclaimer, the term of this patent is extended or adjusted under 35 U.S.C. 154(b) by 98 days.

(21) Appl. No.: 09/781,671

(22) Filed: Feb. 12, 2001

(65) Prior Publication Data

US 2002/0002929 A1 Jan. 10, 2002

Related U.S. Application Data

(60) Provisional application No. 60/184,073, filed on Feb. 22, 2000.

(51) Int. Cl.[7] .............................................. C09K 11/02
(52) U.S. Cl. ..................... 252/301.35; 252/301.21; 252/301.22; 252/301.23; 252/301.24; 428/327; 428/412; 428/458; 428/480; 428/688; 428/690
(58) Field of Search ................................ 428/323, 327, 428/412, 458, 480, 688, 690; 252/301.21, 301.22, 301.23, 301.24, 301.35

(56) References Cited

U.S. PATENT DOCUMENTS

| | | | |
|---|---|---|---|
| 2,354,018 A | 7/1944 | Heltzer et al. | 88/82 |
| 2,354,048 A | 7/1944 | Palmquist | 40/135 |
| 2,354,049 A | 7/1944 | Palmquist | 40/135 |
| 2,379,702 A | 7/1945 | Gebhard | 88/82 |
| 2,407,680 A | 9/1946 | Palmquist et al. | 88/82 |
| 2,498,592 A | 2/1950 | Switzer | 252/301.2 |
| 2,895,917 A | 7/1959 | Gaunt et al. | 252/301.2 |
| 3,190,178 A | 6/1965 | McKenzie | 88/82 |
| 3,279,336 A | 10/1966 | Eaton et al. | 94/44 |
| 3,410,185 A | 11/1968 | Harrington et al. | 94/22 |
| 3,551,025 A | 12/1970 | Bingham | 350/105 |
| 3,664,242 A | 5/1972 | Harrington et al. | 94/22 |
| 3,795,435 A | 3/1974 | Schwab | 350/105 |
| 3,849,351 A | 11/1974 | Jorgenson | 260/18 N |
| 3,874,801 A | 4/1975 | White | 401/2 |

(List continued on next page.)

FOREIGN PATENT DOCUMENTS

| | | |
|---|---|---|
| JP | 00226540 A | 8/2000 |
| WO | WO 99/20688 | 4/1999 |
| WO | WO 99/48961 | 9/1999 |

OTHER PUBLICATIONS

US 5,714,527, 2/1998, Jilek et al. (withdrawn)
Brochure entitled, "Green Lite™ Striping powder and GLG–30 System" (publication 75–0299–9287–4(52.25)R1).
Brochure entitled, "Green Lite™ Striping Powder" (publication 75–0299–7789–1 (120.5)ii).
ASTM D1238–95.
"Mining and Treatment of Raw Materials", by Norton, *Elements of Ceramics*, Chapt. 6, 57–62, (1974).
Burns, D.M. and N.L. Johnson, "Metrology of Fluorescent Retroreflective Materials and its Relationship to their Daytime Visibility," *Analytica Chimica Acta*, vol. 380, 1999, pp. 211–226.

*Primary Examiner*—James J. Seidleck
*Assistant Examiner*—Travis B. Ribar
(74) *Attorney, Agent, or Firm*—Carolyn A. Fischer

(57) ABSTRACT

Daylight fluorescent articles are disclosed that utilize durable fluorescent pigment particles resulting from a fluorescent dye incorporated within a matrix polymer selected from polycarbonate, polyester and mixtures thereof and where the particles are of various desired shapes and sizes. Embodiments of such fluorescent pigment particles may also be retroreflective and are especially useful for pavement marking surfaces and retroreflective products for highway transportation safety.

22 Claims, 1 Drawing Sheet

U.S. PATENT DOCUMENTS

| | | | |
|---|---|---|---|
| 3,914,468 A | 10/1975 | Condon et al. | 427/137 |
| 4,025,159 A | 5/1977 | McGrath | 350/105 |
| 4,058,641 A | 11/1977 | Hnojewyj | 427/137 |
| 4,100,625 A | 7/1978 | Tung | 2/410 |
| 4,530,859 A | 7/1985 | Grunzinger, Jr. | 427/385.5 |
| 4,663,213 A | 5/1987 | Bailey et al. | 428/204 |
| 4,664,966 A | 5/1987 | Bailey et al. | 428/203 |
| 4,772,551 A | 9/1988 | Hart et al. | 435/7 |
| 4,950,525 A | 8/1990 | Bailey | 428/164 |
| 5,064,272 A | 11/1991 | Bailey et al. | 359/541 |
| 5,069,964 A | 12/1991 | Tolliver et al. | 428/325 |
| 5,117,304 A | 5/1992 | Huang et al. | 359/529 |
| 5,125,178 A | 6/1992 | Justice | 42/70.11 |
| 5,138,488 A | 8/1992 | Szczech | 359/529 |
| 5,269,840 A | 12/1993 | Morris et al. | 106/437 |
| 5,387,458 A | 2/1995 | Pavelka et al. | 428/141 |
| 5,450,235 A | 9/1995 | Smith et al. | 359/529 |
| 5,470,502 A * | 11/1995 | Hahn et al. | 252/301.26 |
| 5,605,761 A | 2/1997 | Burns et al. | 428/412 |
| 5,614,286 A | 3/1997 | Bacon, Jr. et al. | 428/161 |
| 5,674,622 A | 10/1997 | Burns et al. | 428/412 |
| 5,706,132 A | 1/1998 | Nestegard et al. | 359/529 |
| 5,714,223 A | 2/1998 | Araki et al. | 418/68 |
| 5,716,706 A | 2/1998 | Morris | 428/402 |
| 5,747,626 A | 5/1998 | Krepski et al. | 528/28 |
| 5,754,338 A | 5/1998 | Wilson et al. | 359/530 |
| 5,756,633 A | 5/1998 | Larson | 528/28 |
| 5,774,265 A | 6/1998 | Mathers et al. | 359/539 |
| 5,784,198 A | 7/1998 | Nagaoka | 359/534 |
| 5,812,316 A | 9/1998 | Ochi et al. | 359/530 |
| 5,882,771 A | 3/1999 | Klein et al. | 428/161 |
| 5,888,618 A | 3/1999 | Martin | 428/156 |
| 5,914,812 A | 6/1999 | Benson et al. | 359/529 |
| 6,001,936 A | 12/1999 | Barrera et al. | 525/454 |
| 6,110,566 A * | 8/2000 | White et al. | 264/1.9 |
| 6,166,106 A | 12/2000 | Purgett et al. | 523/172 |
| 6,217,252 B1 | 4/2001 | Tolliver et al. | 404/77 |
| 6,261,691 B1 * | 7/2001 | Atarashi et al. | 428/403 |
| 6,262,706 B1 * | 7/2001 | Albert et al. | 204/606 |
| 6,274,065 B1 * | 8/2001 | Deno et al. | 106/494 |

* cited by examiner

# DURABLE FLUORESCENT ORGANIC PIGMENTS AND METHODS OF MAKING

Cross-Reference

This application claims the benefit of priority to Provisional Application 60/184,073 of Feb. 22, 2000.

FIELD

The invention relates to fluorescent articles that comprise durable daylight fluorescent pigment particles, for example, retroreflective articles. Such articles are useful for various applications, such as daytime high visibility signaling and marking, pavement markings, personal safety, and signing.

BACKGROUND

Fluorescent retroreflective sheeting has been developed to provide increased safety, especially during daytime and periods of reduced visibility. Durable fluorescent sheeting has recently been developed that can withstand the demanding outdoor environments, such as extremes in temperature, chemical challenges from atmospheric pollution and road salt, and photo-reaction involving infrared, visible, and ultraviolet radiation from sunlight. Only certain combinations of fluorescent dye, stabilizers, and matrix polymers provide durability. The matrix polymers found to date may not have the desired features, such as flexibility and economy, sought for many daytime visual signaling and marking applications. Moreover, the relatively expensive fluorescent dyes have been uniformly dispersed throughout past articles, thereby increasing the cost of these prior articles.

Another problem is that on occasion the in-process and final fluorescent sheeting may not meet the stringent demands of customers because of quality and manufacturing problems, such as from start-up and shut-down. Such reject or production waste is expensive and its expense is further exasperated by having to haul it to a landfill. A use for such waste has long been sought.

Highway signing, especially to mark cross-walks, has been a successful application for the recent durable fluorescent retroreflective sheeting. However there remains a need to have the fluorescent color of the sign match that of the pavement marking. Sufficiently durable fluorescent pavement marking articles have not been available to date, although prior attempts have been made, such as by incorporating the fluorescent dye directly into a binder used for the pavement marking.

One process for application of the pavement marking materials involves passing the materials through a high temperature flame to melt the binder onto the highway. Moreover prior fluorescent pavement marking colorants have generally been ultraviolet (UV) activated with the expectation of UV headlights on vehicles. Such UV activated fluorescent materials do not provide for increased safety during daylight and periods of reduced visibility for many transportation safety applications.

Thus the industry seeks durable fluorescent articles for daytime visual signaling and marking applications.

SUMMARY

Accordingly, the present invention includes in its first aspect a fluorescent pigment comprising in particle form:
a fluorescent dye including thioxanthone, perylene, perylene imide, xanthene compounds and mixtures thereof; and
a polymeric matrix including polycarbonate, polyester, and mixtures thereof; wherein the fluorescent dye is incorporated into the polymeric matrix.

A second aspect of the present invention includes a fluorescent article, comprising:
a binder having a first major viewing surface; and
fluorescent pigment comprising, in particle form, a fluorescent dye including thioxanthone, perylene, perylene imide, xanthene compounds and mixtures thereof; and
a polymeric matrix including polycarbonate, polyester and mixtures thereof; wherein the fluorescent dye is incorporated in the polymeric matrix; and
wherein at least some of the fluorescent pigment particles are disposed so as to be visible on the first major viewing surface of the binder.

A third aspect of the present invention includes a method of making a fluorescent article, comprising the steps of:
providing at least one fluorescent dye including thioxanthone, perylene, perylene imide, xanthene compounds, and mixtures thereof;
providing a polymer matrix including polycarbonate, polyester, and mixtures thereof;
extruding a mixture of said fluorescent dye and the polymer matrix;
fracturing the extrudate to form a fluorescent pigment in a particle form; and
disposing the fluorescent pigment with a binder to form a fluorescent article.

The third aspect of the present invention may include the additional steps of:
fracturing the binder to yield a binder particulate;
providing microstructured surfaces on the fluorescent pigment to form retroreflective fluorescent pigment;
mixing the fluorescent retroreflective pigment with the binder particulate to form a powder blend; and
flame spraying the powder blend onto a suitable substrate.

Alternatively, the third aspect of the present invention may include the additional steps of:
providing the binder as a liquid dispersion;
providing microstructured surfaces on the fluorescent pigment to form retroreflective fluorescent pigment;
mixing the retroreflective fluorescent pigment with the liquid binder to form a liquid blend;
coating the liquid blend onto a suitable substrate; and
curing the liquid blend onto the substrate to form a retroreflective fluorescent article.

The above fluorescent articles containing fluorescent pigment are especially useful in pavement markings.

BRIEF DESCRIPTION OF THE DRAWINGS

The invention will be further explained with reference to the drawings, wherein.

Figure 1A:
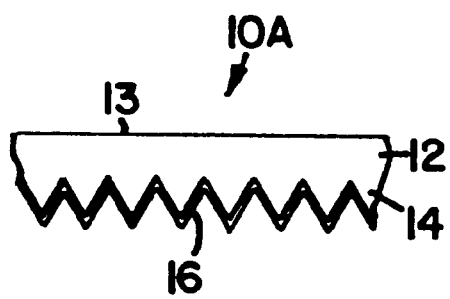
FIGS. 1a–c are cross-sectional views of various retroreflective embodiments of durable fluorescent pigment.

These figures, which are idealized, are not to scale and are intended to be merely illustrative and non-limiting.

DEFINITIONS

As used herein, the phrases "weatherable" or "outdoor durability" refer to the capability of the article to withstand the environment when used for its intended purpose.

As used herein, the word "weathering" shall mean exposing an article to either natural or artificial environments that include heat, light, moisture, and ultraviolet radiation, and combinations thereof.

As used herein, the term "fluorescent pigment" refers to a particle which includes one or more fluorescent dyes in a polymeric matrix including a polycarbonate, a polyester or a mixture thereof. The particle may be of any size and shape depending on the desired use.

As used herein, the word "fracturing" refers to breaking up a sheet of a polymeric matrix and a fluorescent dye incorporated therein into particles by grinding or milling, by way of example.

As used herein, the term "equivalent diameter" shall mean the size that passes a rectangular opening in a screen of that dimension.

The luminance factor (CIE tristimulus value Y) is a standard measure of the amount of light (electromagnetic radiant power that is visually detectable by the normal human observer) radiating from a surface weighted by the eye's efficiency to convert the light to luminous sensation. It is defined as the ratio of the total luminance of a specimen to that of a perfect diffuser illuminated and viewed under the same conditions. For a fluorescent material, the luminance factor is the sum of two quantities, the reflected luminance factor ($Y_R$) and the fluorescence luminance factor ($Y_F$). The fluorescence luminance factor ($Y_F$) is the ratio of the fluorescence luminance (luminance due to emitted light) of the specimen to the luminance reflected by a perfect diffuser similarly illuminated and viewed. Under any specified conditions of illumination and viewing $Y=Y_R+Y_F$. It is the existence of fluorescence luminance ($Y_F>0$) which differentiates fluorescent color specimens from their non-fluorescent counterparts and other non-fluorescent high luminance colored materials. The fluorescence luminance factor ($Y_F$) measured under specified illumination and viewing conditions is a measure of a material's efficiency to convert absorbed electromagnetic radiant power into luminous sensation.

DESCRIPTION OF ILLUSTRATIVE EMBODIMENTS

The present invention provides fluorescent articles comprising durable fluorescent pigment that meet one or more of the prior unmet needs. The fluorescent pigment is surprisingly sufficiently durable for pavement markings, with some embodiments having the ability to be flame processed without loss of fluorescence. The fluorescent pigment may also be made from waste or rejected production scrap resulting from the manufacture of fluorescent prismatic retroreflective sheeting. The combination of the durable fluorescent pigment with a suitable binder results in durable fluorescent articles having conformability and/or other selected desirable features heretofore unavailable. The ability to mix the fluorescent pigment with other particles, such as retroreflective elements and anti-skid particles, also results in durable fluorescent articles heretofore unavailable. Disposal of fluorescent pigment onto only a portion of the viewing surface of a binder or of a sheet results in more efficient use of the expensive dye. Some of the inventive fluorescent articles have a spotty fluorescent appearance when viewed with the naked eye at short distances of about one meter or less, but appear surprisingly uniformly fluorescent when viewed by a motorist in a vehicle at longer distances of about 30 meters or more. The fluorescent pigments have a fluorescence luminance, $Y_F$, greater than 2, preferably greater than 5.

I. Embodiments of Fluorescent Pigment

A. Pigment Composition

1. Polymeric Matrix

The polymeric matrix serves as the host for the dye and whatever adjuvants are desired. The polymeric materials selected for the polymeric matrix are preferably relatively inflexible, hard, and rigid materials relative to other polymers. Thus, these polymers may be fractured at room temperature or lower temperatures. The polymeric matrix is preferably substantially optically clear. Notably, such polymers retain their transparency and their shape under adverse conditions. Suitable polymers include thermoplastic or thermosetting material, as desired. In sum, a suitable polymeric matrix is often selected for one or more of the following reasons: thermal stability, dimensional stability, environmental stability, clarity, excellent release from tooling or a mold, and capability of receiving a reflective coating. Polycarbonate is the preferred polymeric matrix of the present invention.

Other choices for a polymeric matrix include polymers selected from the class of polycarbonate and polyester blends. A polycarbonate/polyester blend commercially available from Eastman Chemical Company, Kingsport, Tenn. under the trade designation "DA003", is an example of a suitable polymeric matrix. Polyester alone is also a useful polymeric matrix.

The fluorescent pigment composition preferably comprises at least 50%, more preferably at least 90%, and most preferably at least 95% by weight of a polymeric matrix.

2. Fluorescent Dyes and Colorants

The fluorescent dyes and colorants of the invention are preferably visible-activated fluorescent colorants as opposed to UV activated fluorescent colorants. The term "visible activated" as used in this invention refers to sunlight or other light having a spectrum containing substantially all of the visible wavelengths of sunlight. Thus the preferred dyes and/or colorants of this invention are brilliantly fluorescent and also bright in color in daylight. Dyes having such properties have been disclosed in U.S. Pat. Nos. 5,387,458 (Pavelka); 5,605,761 (Burns) and 5,674,622 (Burns).

The dyes for the invention are preferably from the perylene, perylene imide, thioxanthone, and xanthene classes of compounds. Typically fluorescent dye concentrations are between about 0.01 and about 2 weight percent of the pigment particle, preferably between about 0.05 and about 0.7 weight percent, and most preferably between about 0.1 and about 0.5 weight percent. Other concentration ranges of dyes may be used depending on the thickness of the article. The above ranges are based on fluorescent pigment particles containing the dyes that have equivalent diameters between about 500 $\mu$m and about 2000 $\mu$m (microns, i.e. micrometers). Articles having high concentrations of dyes tend to exhibit brighter fluorescence than articles having low concentrations of dyes. However articles having a high dye concentration may exhibit a self-quenching phenomenon which occurs when molecules of the fluorescent dye absorb the energy emitted by neighboring fluorescent dye molecules. This self-quenching phenomenon causes an undesirable decrease in fluorescent brightness.

Specific examples of suitable fluorescent dyes are listed in the table below.

| FLUORESCENT DYE | TRADE DESIGNATION | SOURCE |
| --- | --- | --- |
| Thioxanthene | Golden Yellow D304 | Day-Glo Color Corp. Cleveland, OH |
| Perylene | Lumogen F 083 | BASF Corp., Mount Olive, NJ |
| Xanthene | CI Solvent Green 4 | BASF Corp., Mount Olive, NJ |
| Thioxanthone | Hostasol Red GG | Clariant Corp., Charlotte, NC |
| Thioxanthene | CI Solvent Yellow 98 | Clariant Corp., Charlotte, NC |
| Perylene imide | Lumogen F Orange 240 | BASF Corp., Mount Olive, NJ |

A single fluorescent dye or colorant may be used or a combination of one or more fluorescent dyes and one or more conventional colorants may be used to create fluorescent articles of the invention.

3. Other Adjuvants

The function of some of the desirable adjuvants is to improve the durability of the dye in the polymeric matrix. Adjuvants may also be present in the fluorescent pigment for other desired improvements, such as to improve processing in extrusion equipment.

Light stabilizers that may be used include hindered amines. Illustrative examples of hindered amine light stabilizers (HALS) include those commercially available from the Ciba-Geigy Corporation, Hawthorne, N.Y. under the trade designations "TINUVIN-144, -292, -622, -770," and "CHIMASSORB-944." HALS are preferably added at about 0.1 to 2 weight percent of the fluorescent pigment, although larger amounts may also be added if desired.

Illustrative examples of UV absorbers include derivatives of benzotriazole, such as those commercially available from Ciba-Geigy Corp. under the trade designations "TINUVIN-327, -328, -900, -1130, " and "TINUVIN-P"; chemical derivatives of benzophenone, such as those commercially available from BASF Corp. under the trade designations "UVINUL-M40, -408, -D-50"; chemical derivatives of diphenylacrylate, such as those commercially available from BASF Corporation under the trade designations "UVINUL-N35, -539. UV absorbers are preferably added at about 0.5 to 2 weight percent of the fluorescent pigment, although again different amounts may also be used if desired.

Free radical scavengers or antioxidants may be used. Illustrative examples of suitable antioxidants include hindered phenolic resins, such as those commercially available from the Ciba-Geigy Corp. under the trade designations "IRGANOX-1010, -1076, -1035," and "MD-1024," and "IRGAFOS-168." These adjuvants are added in amounts suitable to decrease oxidation, such as for example about 0.01 to 0.5% by weight of adjuvant in the fluorescent pigment.

Small amounts of processing aids may be added to improve the matrix polymer's processability, such as in extrusion equipment. Useful processing aids include: (1) fatty acid esters, or fatty acid amides; (2) metallic stearates; or (3) waxes, oils, and release agents for aid in extrusion processes. Anti-sticking powders, such as talc, fumed silica, clay, and calcium carbonate, may also be used to aid in extrusion processes. Such adjuvants are added in amounts that do not significantly reduce transparency of the matrix polymer and yet provide the desired function. Such adjuvants are typically no more than about one percent by weight of the fluorescent pigment, but may be more or less as noted to serve functionally.

B. Pigment Structure (Shape and Size)

The durable fluorescent pigment may be either (1) non-retroreflective, or (2) structured so as to be retroreflective.

1. Non-Retroreflective

Fluorescent pigment includes particles of a variety of shapes, including spherical, platelets such as may result from fracturing thin films and sheets, flakes, fibrous, and odd shapes. Since shape may vary so widely, a useful measure of pigment size is to measure in terms of equivalent diameter, or the size that passes a rectangular opening in a screen of that dimension. Since the shape may vary so widely, the equivalent diameter of the fluorescent pigment may also vary over a wide range depending on the desired effect. A preferred range of equivalent diameter is from about 10 to about 5000 $\mu$m.

2. Retroreflective

When it is desired that the pigment particle be retroreflective, the fluorescent pigment may include retroreflective elements such as microspheres and microstructured elements. These result from fracturing retroreflective sheets. Useful retroreflective elements include those described in the foregoing retroreflective sheeting patents.

The types of retroreflective sheeting are described in "Standard Specification for Retroreflective Sheeting for Traffic Control", ASTM D 4956-94. Brightness or retroreflectivity of the sheeting may be expressed as the Coefficient of Retroreflection, $R_A$. This is measured in units of candelas/lux/square meter and is determined using standardized test ASTM E 810-94.

Illustrative examples of exposed lens retroreflective sheeting are disclosed in U.S. Pat. Nos. 2,326,634 (Gebhard); 2,354,018 (Heltzer); 2,354,048 (Palmquist); 2,354,049 (Palmquist); 2,379,702 (Gebhard); and 2,379,741 (Palmquist).

Illustrative examples of enclosed lens retroreflective sheeting are disclosed in U.S. Pat. Nos. 2,407,680 (Palmquist); 3,551,025 (Bingham); 3,795,435 (Schwab); 4,530,859 (Grunzinger, Jr.); 4,664,966 (Bailey); 4,950,525 (Bailey); 5,064,272 (Bailey); and 5,882,771 (Klein).

Illustrative examples of encapsulated lens retroreflective sheeting are disclosed in U.S. Pat. Nos. 3,190,178 (McKenzie); 4,025,159 (McGrath); 4,663,213 (Bailey); 5,069,964 (Tolliver); 5,714,223 (Araki); 5,812,316 (Ochi); and 5,784,198 (Nagaoka).

Illustrative examples of encapsulated prismatic-type retroreflective sheeting are disclosed in U.S. Pat. Nos. 5,138,488 (Szczech); 5,450,235 (Smith); 5,614,286 (Bacon); 5,706,132 (Nestegard); 5,714,223 (Araki); and 5,754,338 (Wilson).

Illustrative examples of raised-ridge prismatic-type retroreflective sheeting are disclosed in U.S. Pat. No. 5,914,812 (Benson).

Figure 1B:
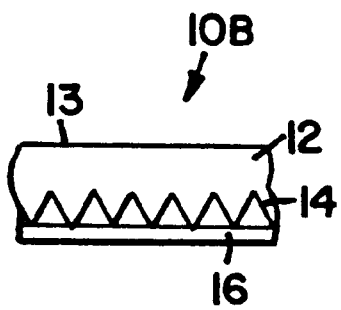
Figure 1C:
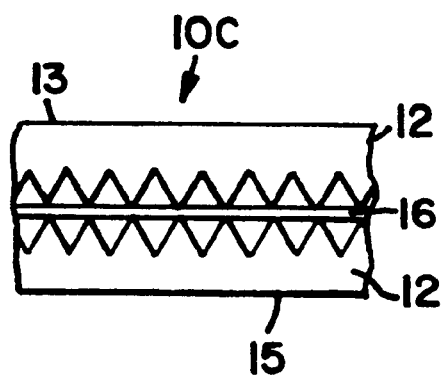

Some embodiments of prismatic-type retroreflective fluorescent articles comprising the durable fluorescent pigment are illustrated in FIGS. 1a–c.

An embodiment of the present invention includes the retroreflective members of the Figures which are now described in more detail.

FIG. 1a illustrates a structured reflector-coated prismatic-type retroreflective fluorescent pigment 10a resulting from fracturing a reflector-coated prismatic retroreflective sheet containing a retroreflective member 12 having a first major retroreflective surface 13, and a second opposing microstructured surface 14. The microstructured surface preferably contains retroreflective elements, such as prisms or cubes, with a reflective coating 16 thereon. The retroreflective member may have a face member, overlay, cover film, top film, front face, top layers, or top coat thereon. Thus the retroreflective member may comprise a multilayer film. Suitable retroreflective members provide a substantially transparent retroreflective surface that protects the retroreflective elements on the microstructured surface from a variety of possible destructive effects, such as dirt, water, and exposure to weather and outdoor conditions. Polymers selected for the retroreflective member are preferably dimensionally stable, durable, weatherable, and readily formable into a desired configuration. Polymers are selected for the retroreflective member in view of the properties desired of the resultant article, the methods used for forming the retroreflective surface, the desired bondability to a sealing member (if present), and the nature of any other members of the retroreflective pigment. Polymers selected for the retroreflective member preferably should form cube corner elements that are dimensionally stable so that precise geometry desired for retroreflection is maintained, regardless of various geometric designs. The retroreflective elements may also be called cube corners, prisms, microprisms, or triple mirrors. The basic cube corner retroreflective element is generally a tetrahedral structure having, for example, a base triangle and three mutually substantially perpendicular optical faces that cooperate to retroreflect incident light. The optical faces preferably intersect at an apex, with the base triangle lying opposite the apex. Each cube corner element also has an optical axis, which is the axis that extends through the cube corner apex and trisects the internal space of the cube corner element. Light incident on the first major retroreflective surface enters the base triangle and is transmitted into the internal space of the cube, is reflected from each of the three optical faces, and is redirected back in the same general direction as the incoming incident light. As previously noted, it is optional whether the faces of the cubes are exposed to an air interface as provided by a sealing member or coated with a reflective coating, such as aluminum. The microstructured surface may be molded to yield a cube layer using any of a variety of techniques known to those skilled in the art.

The retroreflective member is preferably sufficiently thick to provide the above desirable properties. The thickness of the retroreflective member preferably is between about 0.01 mm to 0.3 mm thick, and more preferably between 0.02 mm to 0.2 mm.

All of the polymers and various members of the retroreflective article may contain adjuvants for various purposes. Colorants, UV absorbers, fluorescent dyes in addition to those in the polymer matrix of the pigment of the present invention, light stabilizers, free radical scavengers or antioxidants, processing aids such as antiblocking agents, releasing agents, lubricants, additives to improve weathering and heat stability, and other additives may be added to the various polymers or materials as desired.

FIG. 1b illustrates a fluorescent pigment 10b having a sealing member 16 attached to the microstructured surface 14, thus obviating the need for a reflective coating on the microstructured surface. Fluorescent pigment 10b also includes a retroreflective member 12 having a first major retroreflective surface 13 thereon, as previously shown in FIG. 1a. Some illustrative examples of materials for the sealing member include thermoplastic, heat-activated, ultra-violet cured, and electron beam cured polymer systems. The bonding portions between the retroreflective member and sealing member form seal legs. These legs have a height sufficient to provide an air interface for the microstructured surface. The seal legs may be formed, for example, by application of heat and pressure to the retroreflective member and the face member as disclosed in U.S. Pat. No. 3,190,178 (McKenzie). In this embodiment, the seal legs may form a sealing pattern that comprises individual air cells each having a small area on the first major retroreflective surface 13 of the fluorescent pigment. Seal legs may also be called sealing walls, bonds, bond lines, septa, or seal leg members. The sealing member may be colored to complement or contrast with the fluorescent pigment as desired.

FIG. 1c illustrates a fluorescent pigment 10c that is made by laminating together the sealing layers 16 of two fluorescent pigments of FIG. 1b. Fluorescent pigment 10c also comprises two retroreflective members 12 having a first major retroreflective surface 13 and a second opposing major retroreflective surface 15, respectively.

The advantage of the fluorescent pigment of FIG. 1c is that these pigment particles are more retroreflective regardless of their orientation in the fluorescent article. The equivalent diameters of the retroreflective fluorescent pigment preferably comprise at least one retroreflective element and more preferably comprise at least several elements. Retroreflective fluorescent pigment, such as shown in FIG. 1a, may have equivalent diameters of at least about 10 $\mu$m, more preferably of at least about 70 $\mu$m, and most preferably of at least about 200 $\mu$m. Retroreflective fluorescent pigment, such as shown in FIG. 1b, may have equivalent diameters of at least about 200 $\mu$m, more preferably of at least about 5000 $\mu$m, and most preferably of at least about 10,000 $\mu$m. Retroreflective fluorescent pigment, such as shown in FIG. 1c, may have equivalent diameters of at least about 500 $\mu$m, more preferably of at least about 10,000 $\mu$m, and most preferably of at least about 20,000 $\mu$m. Although these equivalent diameters are given as general ranges, equivalent diameters depend on the type of retroreflective article, such as the thickness of retroreflective member, the thickness of the sealing layer, and the sealing pattern or relative size of the individual cells. In this regard, the equivalent diameter of the retroreflective fluorescent pigment 1c is larger than that of pigment 1a in order to retain reflectivity when used in a binder or sheeting.

Although prismatic type sheeting is preferred, retroreflective articles using microspheres may also be used. The equivalent diameters of fluorescent pigment that is also retroreflective because of using microspheres as the retroreflective elements are considerably smaller. For example, glass microspheres may have diameters of about 60 $\mu$m. Since each retroreflective fluorescent pigment comprises at least one retroreflective element, the equivalent diameter of the pigment may be of the order of 60 $\mu$m or more.

C. Pigment Mixtures

An advantage in the use of the fluorescent pigment of this invention is their ability to be mixed with other particles, usually prior to their addition to a binder or a sheet. Alternately each type of particle and/or the fluorescent pigment may be placed at selected positions in the binder or the sheet. Examples of other particles are anti-skid particles, such as disclosed in U.S. Pat. No. 5,125,178 (Haenggi); ceramic beads such as disclosed in U.S. Pat. No. 4,772,551 (Wood); glass beads such as disclosed in U.S. Pat. No. 5,716,706 (Morris); retroreflective elements such as disclosed in U.S. Pat. No. 5,774,265 (Mathers); and colored particles such as disclosed in U.S. Pat. No. 5,269,840 (Morris).

II. Articles Having Fluorescent Pigment

Fluorescent articles, comprising the durable fluorescent pigment, either non-retroreflective or retroreflective, have numerous embodiments. Some of these embodiments include the following:

Non-fluorescent sheeting comprising either fluorescent pigment or retroreflective fluorescent pigment or combinations thereof;

Fluorescent sheeting comprising the fluorescent pigment or retroreflective fluorescent pigment or combinations thereof;

Retroreflective sheeting comprising the fluorescent pigment or retroreflective fluorescent pigment or combinations thereof;

Binder systems comprising either fluorescent or retroreflective fluorescent pigment or combinations thereof;

Fluorescent binder systems comprising either fluorescent or retroreflective fluorescent pigment or combinations thereof; and Retroreflective binder systems comprising either fluorescent or retroreflective fluorescent pigment or combinations thereof.

Numerous other combinations and variations are apparent to those skilled in the art based on the teachings herein. Suitable carriers for the fluorescent pigment are preferably a polymeric binder or a polymeric sheet. Some more specific or preferred examples will now be described.

A. Sheeting

Sheeting and other useful articles may be made by compounding the fluorescent pigment described above with a suitable binder, preferably a polymeric binder of a different composition than that of the polymeric matrix. Binders may be thermoplastic or thermosetting, may be adhesives, and may be a liquid that is later cured, such as for paints.

Binders are preferable polymeric for many applications related to transportation safety. A particularly preferred polymeric binder is polyurethane. Those skilled in the art will recognize that the term "polyurethane" typically includes polymers having urethane and/or urea linkages, and such is the intended meaning herein. Suitable urethane polymers or copolymers for use in this layer include polyether polyurethanes, polyester polyurethanes, polycarbonate polyurethanes and blends thereof. Suitable urethanes include aliphatic or aromatic urethanes or blends thereof. Typically, many suitable thermoplastic polyurethanes include three main components: an aliphatic and/or aromatic diisocyanate; a chain extender (such as an ethylene-, propylene- or butane- diol); and a soft segment polyol (such as polyether or polyester, e.g., polyethyleneoxide, polyadipate, or polycaprolactone). Suitable urethane polymers include thermoplastic polyurethane polymers commercially available from Morton International, Chicago, Ill., under the trade designation "MORTHANE," and others including aliphatic and aromatic polyurethanes, such as disclosed in U.S. Pat. No. 5,117,304 (Huang).

In addition to polyurethanes, binders and sheets comprising substantially solventless plasticized polyvinyl chloride (PVC) are known in the retroreflective art, such as published in WO 99/20688 (White). Fluorescent articles comprising PVC binders or sheets and fluorescent pigment have many desirable features, such as economy and flexibility.

Other suitable polymers for binders or sheets include:

copolymers of ethylene with vinyl acetate (EVA), e.g. those commercially available from DuPont, Wilmington, Del., under the trade designation "ELVAX"; from Equistar Chemicals, Houston, Tex. under the trade designation "ULTRATHENE"; and from AT Plastics, Brampton, ON, Canada, under the trade designation "ATEVA";

acid- or anhydride-modified EVAs, e.g. those commercially available from DuPont under the trade designation "ELVAX"; from Equistar Chemicals under the trade designation "ULTRATHENE"; and from DuPont under the designation "BYNEL" series 1100, 3000, 3800 and 3900 resins;

other modified EVAs, such as acid or anhydride-/acrylate-modified EVAs commercially available from DuPont under the trade designation "BYNEL", series 3100 resins;

ethylene ethyl acrylate copolymers (EEA), e.g. those commercially available from DuPont under the trade designation "ALATHON"; from Union Carbide Corporation, Danbury, Conn., under the trade designation "UNION CARBIDE DPD";

ethylene methyl acrylate copolymers (EMA), e.g. those commercially available from Chevron Phillips Chemical Company, Houston, Tex. under the trade designations "EMAC" and "EMAC+";

acid- or anhydride-modified ethylene acrylate materials (AEA), e.g., those commercially available from DuPont under the trade designation "BYNEL" series 2000 and 2100 resins;

ethylene vinyl acetate, carbon monoxide terpolymers (EVACO), e.g., commercially available from DuPont under the trade designation "ELVALOY";

ethylene n-butyl acrylate, carbon monoxide terpolymers (EBACO grade HP662 resins), e.g. commercially available from DuPont under the trade designation "ELVALOY"; and ethylene n-butyl acrylate copolymers (EnBA).

Binders holding the fluorescent pigment in a suitable position are selected to form a satisfactory fluorescent article. The binder may have the fluorescent pigment dispersed throughout, either randomly or oriented to provide maximum visibility performance, or the fluorescent pigment may be only on the viewing surface of the binder, or various combinations thereof.

The amount of fluorescent pigment is sufficient to attain the desired fluorescent appearance for the article. The amount of fluorescent pigment is preferably a minimum to achieve both economy and fluorescence for the article. The amount of fluorescent pigment is dependent on the equivalent diameter of the pigment. For example, for pigment having an equivalent diameter of approximately 3000 $\mu$m, an application rate of approximately 50 grams per square meter on a binder or on a sheet is sufficient to make a fluorescent article. The application rate of fluorescent pigment may also be adjusted to achieve total coverage of the surface of the binder or sheet, as desired.

A non-fluorescent binder or sheet having fluorescent pigment disposed in selected positions to form fluorescent articles results in articles that do not have the dye uniformly dispersed throughout the article. Such articles have not heretofor been available. The inventive articles have considerable economy by being fluorescent without substantial use of fluorescent dye. Contrary to prior articles, the inventive articles are particularly useful for various applications, such as for pavement markings.

B. Flame Sprayed Pavement Marking Articles

The fluorescent pigment in combination with a binder, preferably a thermoplastic, may be adhered to a pavement marking surface or suitable substrate to form fluorescent pavement marking articles. Suitable substrates for pavement markers are known to be typically either concrete or asphalt. Flame sprayed thermoplastic pavement marking systems have relatively low cost, and are especially quick and easy to apply, even on roughened or cracked surfaces or under extremely low temperatures.

U.S. Pat. Nos. 3,279,336 (Eden); 3,393,615 (Micheln); 3,410,185 (Harrington); 3,664,242 (Harrington); 3,849,351 (Jorgansen); 3,874,801 (White); 3,914,468 (Condon); 4,058,641 (Hnojewyj); and U.S. Ser. No. 09/132,270 (Purgett); and the brochures entitled "Green Lite™ Striping powder and GLG-30 System" (publication 75-0299-9287-4(52.25)R1) and "Green Lite™ Striping Powder" (publication 75-0299-7789-1 (120.5)ii) describe machines and compositions for use in flame spray pavement marking applications. Preferably such devices employ an air-propane combustion system, and provide reliable control of process variables, such as machine speed, material flow rates, pavement marking surface preheat temperature, flame size and shape, and material residence time in the flame. For example, by using fluidized powder feed mechanisms such as those employed in delivery systems commercially available from Eutectic Corporation (Charlotte, N.C.) under the trade designation "TECFLO Model 5102" or "TECFLO 3500 Model E", the delivery rate of the fluorescent pavement marking powder can be reliably controlled. Flame sprayable materials typically have melt indices above about 80, more preferably above about 200, and most preferably above about 500. The melt index of a material may be determined according to Condition 190/2.16 and the procedure given in ASTM D1238-95.

C. Liquid Pavement Marking Articles

Fluorescent pigment may be added to liquid binders, sprayed onto a road surface, and cured to form liquid pavement marking articles. Preferred liquid binders are either water-borne or solvent-free, such as those disclosed in U.S. Pat. Nos. 5,714,527 (Jilek); 5,747,626 (Krepski); 5,756,633 (Larson); and U.S. Ser. No. 09/096,923 (Purgett).

D. Embodiments of Other Articles

The fluorescent pigment in combination with a binder or sheet may be placed on a helmet or other articles to provide increased visibility and durability in such transportation safety applications as described in U.S. Pat. No. 4,100,625 (Tung).

III. Methods of Making Fluorescent Pigment

Fluorescent pigment may be made by grinding sheets of binder materials containing dye to form particles. Such binder materials are described in U.S. Pat. Nos. 5,605,761 (Burns); and 5,674,622 (Burns). The fluorescent pigment may also be made by grinding fluorescent pellets used for making fluorescent articles, or fluorescent film or fluorescent cube layers, for example as described in U.S. Pat. Nos. 5,605,761 (Burns); and 5,674,622 (Burns). Alternately the fluorescent pellets may be used as is for fluorescent pigment. Retroreflective sheeting, of various types, for example as described in the above Burns patents, may also be ground to equivalent diameters suitable for making fluorescent articles. Suitable grinding methods, also more generally known as comminution, are disclosed in "Mining and Treatment of Raw Materials", by Norton, *Elements of Ceramics*, Chapt. 6, 57–62, (1974). This reference also discloses Tyler Series Screens and size classification of particles using such screens. Equivalent diameter of the fluorescent pigment corresponds to the size of the opening in the screen at which 100 weight percent of the particles pass through the opening.

EXAMPLES

Features and advantages of this invention are further explained in the following illustrative examples. All parts and percentages herein are by weight unless otherwise specified; "g/m$^2$" designates grams per square meter. The constructions cited were evaluated by tests as follows:

Example 1

Flame Sprayed Fluorescent Pavement Marking

A matrix polymer, dye, and HALS mixture was prepared as follows: The matrix polymer was polycarbonate pellets designated as Makrolon FCR-2407 from Bayer Corporation, Pittsburgh, Pa., USA. The dye was SY98, designated CI Solvent Yellow 98 thioxanthene, commercially available from Clariant. The HALS was "TINUVIN 622", commercially available from Ciba Geigy. The composition of the mixture was 99.3 wt % polycarbonate, 0.2 wt % SY98, and 0.5 wt % HALS. The mixture was dried overnight to remove moisture.

The polycarbonate, dye, and HALS mixture was then extruded into approximate 0.1 mm thick film using a single screw extruder having three heating zones set at 260° C., 260° C., and 304° C. The temperature profile was such that the lowest temperature started at the feed hopper and progressed to 304° C. at the die end of the extruder. The extruder was a 2 centimeter single screw for the Haake Rheocord from Haake, Karlsruhe, Germany.

The film was ground, milled, or diced into fluorescent yellow-green pigment powder using a Cumberland grinder from Cumberland Engineering Co., Providence, R.I., USA. The pigment contains particles ranged in equivalent diameter, as determined by sieves, from dust to approximately 5000 μm platelets. However most of the fluorescent pigment was in the range of 10 μm to 5000 μm in equivalent diameter.

A flame sprayable pavement marking powder commercially available from Minnesota Mining and Manufacturing Company ("3M") under the trade designation "STAMARK Thermal Spray System Series 3100" was dry blended with the fluorescent pigment powder in a ratio of about 40 weight % fluorescent pigment powder with about 60 weight % pavement marking powder. This mixture was flame sprayed to a thickness of about 2 mm onto aluminum panels using a striping machine commercially available from 3M under the trade designation "GREEN LITE Model GLG-30."

Although there was some loss of fluorescent pigment in this process, the resulting fluorescent coating gave the appearance of a yellow green color when viewed under pavement marking conditions at a distance of 30 meters and at an observation angle of about 88 degrees.

The daytime color of a sample of the fluorescent marking construction was measured in the laboratory using a Labsphere BFC-450 Bispectral Colorimeter (Labsphere, North Sutton, N.H.). The daytime chromaticity (x,y), total luminance factor ($Y_T$), and fluorescent luminance factor ($Y_F$), which is a measure of the marking's fluorescent properties, calculated for CIE D65 and the CIE 1931 observer are as follows: (x,y)=(0.3347, 0.3840), $Y_T$=80.06, $Y_F$=9.51.

Example 2

Liquid Fluorescent Pavement Marking

Fluorescent yellow-green pigment was prepared as per Example 1.

A liquid binder was prepared per U.S. Ser. No. 09/096,923 (Purgett). The liquid binder consisted of 23 grams of an aspartic ester diamine ("DESMOPHEN XP-7059", commercially available from Bayer Corp, Pittsburgh, Pa.), 28 grams of an aspartic ester diamine ("DESMOPHEN XP-7053" commercially available from Bayer Corp.), and 40.95 grams of polyisocyanate ("DESMODUR N-3300" commercially available from Bayer Corp.). The two aspartic ester diamines were mixed for about 1 minute and then the mixed diamines were mixed with the polyisocyanate for an additional minute to form a clear polyurea liquid binder.

The fluorescent pigment of Example 1 was added to the clear polyurea liquid binder to form a castable blend. This castable blend was doctor bladed onto aluminum panels to form fluorescent coatings that were approximately 0.4 mm thick.

The fluorescent coatings gave a daylight fluorescent yellow-green appearance when viewed under pavement marking conditions at a distance of 30 meters and at an observation angle of about 88 degrees.

The daytime color of a sample of the fluorescent marking construction was measured in the laboratory using a Labsphere BFC-450 Bispectral Colorimeter. The daytime chromaticity (x,y), total luminance factor ($Y_T$), and fluorescence luminance factor ($Y_F$), which is a measure of the marking's fluorescent properties, calculated for CIE D65 and the CIE 1931 observer are as follows: (x,y)=(0.4172, 0.5551), $Y_T$=49.47, $Y_F$=21.68.

Example 3

Fluorescent Pavement Marking Incorporating Fluorescent Pigment Particles

A yellow fluorescent marking construction was prepared in place as follows. The marking was applied directly to the curbstone forming a stripe nominally 0.3 m wide and 124 m in length. First a base coat of alkyd paint commercially available from Atomikusu Company (Japan) under the trade designation "Hard-Line" was applied with a sponge roller at a coverage rate of 115 g/m. The paint was allowed to dry 10–20 minutes. Next a fluorescent clear coat was applied over the paint. The fluorescent clear coat was composed of 50 parts by weight of an acrylic polymer (commercially available from Rohm and Haas under the trade designation "ACRYLOID B66"), and 0.15 part a perylene imide dye (commercially available from BASF, under the trade designation "LUMOGEN F240"), dissolved in 100 parts propylene glycol methylether acetate (commercially available from Dow Chemical under the trade designation "DOWANOL PMA"). The fluorescent clear coat was applied over the paint with a sponge roller at a rate of 77 g/m.

A mixture of glass beads and the fluorescent pigment particles were then spray applied onto the fluorescent clear coat while it was still wet. The glass beads were 1.5 index beads with a nominal particle size of 500–710 microns commercially available from Gakunann Koki Company (Japan). The fluorescent pigment particles were produced by first melt blending 150 parts by weight polycarbonate resin, commercially available from Mitsubishi Engineering Plastics Corp., Japan under the trade designation "IUPILON S-2000U", 0.03 part dye, commercially available from BASF under the trade designation "LUMOGEN F240", and 0.5 parts ultraviolet light absorber (UVA), commercially available from Ciba-Geigy under the trade designation "TINUVIN 324". Then the polycarbonated/dye/UVA blend was ground into particles with a particle size less than 1000 μm using a Victory-mill VP-1 from Hosokawa Mikuron Co. (Japan). The application rate for the glass beads was nominally 56 g/m and 22 g/m for the fluorescent pigment particles. The marking construction was allowed to air dry for 20–30 minutes after applying the glass beads and fluorescent pigment particles.

The fluorescent marking gave a daylight fluorescent yellow appearance when viewed under pavement marking conditions at a distance of 30 meters and at an observation angle of about 88 degrees. The daytime color of a sample of the fluorescent marking construction was measured in the laboratory using a Labsphere BFC-450 Bispectral Colorimeter. The daytime chromaticity (x,y), total luminance factor ($Y_T$) and fluorescence luminance factor ($Y_F$), calculated for CE D65 and the CIE 1931 observer were as follows: (x,y)=(0.543, 0.426), $Y_T$=35.5, $Y_F$=9.2. The measurements were carried out as described in Bums, D. M. and N. L. Johnson, "Metrology of Fluorescent Retroreflective Materials and its Relationship to their Daytime Visibility," *Analytica Chimica Acta*, Vol. 380, 1999, pp. 211–226.

Example 4

Extruded Film Incorporating Fluorescent Pigment Particles

Fluorescent yellow-green pigment as per Example 1 in equivalent diameter from 10 microns to 100 microns was blended into ethylene acrylic acid resin pellets (commercially available from Dow Chemical Co., Midland Mich. under the trade designation "PRIMACOR 3440") at 40 wt %. The dry-blended mixture was then extruded into film of about 0.01 cm thick using a single screw extruder with three heating zones set at 350° C., 380° C., 400° C. and a film die set at 400° C. The extruder was a ¾-inch single screw extruder for the Haake Rheocord commercially available from Haake of Karlsruhe, Germany.

The daytime color of a sample of the fluorescent extruded film was measured in the laboratory using a Labsphere BFC-450 Bispectral Colorimeter. The daytime chromaticity (x,y) total luminance factor ($Y_T$), and fluorescence luminance factor ($Y_F$), which is a measure of the film's fluorescent properties, calculated for CIE D65 and the CIE 1931 observer are as follows: (x,y)=(0.3277, 0.3754), $Y_T$=77.79, $Y_F$=7.33.

The complete disclosure of all patents, patent documents, and publications are incorporated herein by reference as if individually incorporated. Various modifications and alterations of this invention will become apparent to those skilled in the art without departing from the scope and spirit of this invention.

What is claimed is:

1. A fluorescent pigment comprising in particle form:
   a fractured retroreflective sheeting comprising
   a fluorescent dye selected from the group of thioxanthone, perylene, perylene imide, xanthene compounds and mixtures thereof; incorporated into
   a polymeric matrix selected from the group of polycarbonate, and mixtures thereof.

2. The pigment of claim 1, further comprising:
   microstructured surfaces on the pigment, forming a retroreflective fluorescence pigment.

3. The pigment of claim 2, wherein:
   the microstructured surfaces have a reflective coating thereon.

4. The pigment of claim 2, wherein:
   the microstructured surfaces have a sealing member thereon.

5. The pigment of claim 1, wherein the fluorescent pigment has an equivalent diameter between about 10 microns to about 5000 microns.

6. The pigment of claim 1, wherein the dye comprises about 0.01 to about 2 weight percent of the fluorescent pigment.

7. The pigment of claim 1, further comprising a hindered amine light stabilizer; wherein the hindered amine light stabilizer comprises about 0.1 to about 0.8 weight percent of the fluorescent pigment.

8. The pigment of claim 7, wherein the hindered amine light stabilizer is a 2,2,6,6-tetramethyl piperidine compound.

9. The pigment of claim 1, further comprising retroreflective elements.

10. The pigment of claim 9, wherein the retroreflective elements are selected from the group of microspheres and microstructured elements.

11. The pigment of claim 1 having a fluorescence luminance factor greater than 2.

12. A fluorescent article, comprising:

a binder having a first major viewing surface; and fluorescent pigment comprising, in particle form, fractured retroreflective sheeting comprising a fluorescent dye selected from the group of thioxanthone, perylene, perylene imide, xanthene compounds and mixtures thereof; and a polymeric matrix selected from the group of polycarbonate, polyester and mixtures thereof; wherein the fluorescent dye is incorporated in the polymeric matrix; and wherein at least some of the fluorescent pigment particles are disposed on or in the binder so as to be visible on the first major viewing surface of the binder.

13. The article of claim 12, wherein the binder is a thermoplastic or thermoset polymer, or mixtures thereof.

14. The article of claim 12, wherein the binder is a polymer selected from the group of polyurethane, polyacrylates, plasticized polyvinyl chloride, polyolefins, and mixtures thereof.

15. The article of claim 12, wherein the binder is a multilayer film.

16. The article of claim 12, wherein the binder further comprises fillers selected from the group of glass beads, ceramic microspheres, anti-skid particles, and inorganic powders.

17. The article of claim 12, further comprising:

a colored backing layer; and a fluorescent layer comprising the fluorescent pigment and the binder, wherein the backing layer is disposed adjacent the fluorescent layer.

18. The article of claim 12, wherein the fluorescent pigment is disposed throughout the binder.

19. A method of making a fluorescent article, comprising the steps of:

providing at least one fluorescent dye selected from the group of thioxanthone, perylene, perylene imide, xanthene compounds, and mixtures thereof;

providing a polymer matrix selected from the group of polycarbonate, polyester, and mixtures thereof;

extruding a mixture of said fluorescent dye and the polymer matrix;

fracturing the extrudate to form a fluorescent pigment in a particle form; and disposing the fluorescent pigment on or in a binder to form the fluorescent article.

20. The method of claim 19, comprising the additional steps of:

fracturing the binder to yield a binder particulate;

providing microstructured surfaces on the fluorescent pigment to form retroreflective fluorescent pigment;

mixing the fluorescent retroreflective pigment with the binder particulate to form a powder blend; and flame spraying the powder blend onto a suitable substrate.

21. The method of claim 19, comprising the additional steps of:

providing the binder as a liquid dispersion;

providing microstructured surfaces on the fluorescent pigment to form retroreflective fluorescent pigment;

mixing the retroreflective fluorescent pigment with the liquid binder to form a liquid blend;

coating the liquid blend onto a suitable substrate; and curing the liquid blend onto the substrate to form a retroreflective fluorescent article.

22. The method of claim 20, wherein the suitable substrate is a pavement marking surface.

* * * * *

UNITED STATES PATENT AND TRADEMARK OFFICE
CERTIFICATE OF CORRECTION

PATENT NO.     : 6,533,961 B2                                                Page 1 of 1
DATED          : March 18, 2003
INVENTOR(S)    : Harelstad, Roberta E.

It is certified that error appears in the above-identified patent and that said Letters Patent is hereby corrected as shown below:

Title page,
Item [56], U.S. PATENT DOCUMENTS, insert -- 5,149,830 A  9/92  Locateu et al., --
FOREIGN PATENT DOCUMENTS, insert:
-- EP    0 283 436        9/88
   EP    0 432 445        6/91
   JP    482917           3/92
   EP    0 438 882        7/91--

Column 5,
Line 43, insert -- " -- following ".".

Column 14,
Line 15, "Bums" should read -- Burns --.
Line 52, delete "a" preceding "fractured".
Line 58, insert -- polyester, -- following ",".
Line 61, "fluorescence" should read -- fluorescent --.

Signed and Sealed this

Seventh Day of October, 2003

JAMES E. ROGAN
*Director of the United States Patent and Trademark Office*